(12) United States Patent
Kawauchi et al.

(10) Patent No.: US 9,701,029 B2
(45) Date of Patent: Jul. 11, 2017

(54) MANIPULATOR

(71) Applicant: MITSUBISHI HEAVY INDUSTRIES, LTD., Tokyo (JP)

(72) Inventors: Naoto Kawauchi, Tokyo (JP); Kiyoshi Hirokawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/033,306

(22) PCT Filed: Jul. 28, 2014

(86) PCT No.: PCT/JP2014/069866
§ 371 (c)(1),
(2) Date: Apr. 29, 2016

(87) PCT Pub. No.: WO2015/068436
PCT Pub. Date: May 14, 2015

(65) Prior Publication Data
US 2016/0271807 A1    Sep. 22, 2016

(30) Foreign Application Priority Data

Nov. 8, 2013  (JP) .................................. 2013-232267

(51) Int. Cl.
*B25J 17/00* (2006.01)
*B25J 17/02* (2006.01)
(Continued)

(52) U.S. Cl.
CPC ....... *B25J 19/0029* (2013.01); *B25J 19/0079* (2013.01)

(58) Field of Classification Search
CPC .... B25J 19/0029; B25J 9/142; B25J 19/0079; B25J 19/0025; B25J 9/065; B25J 9/06;
(Continued)

(56) References Cited

U.S. PATENT DOCUMENTS 3,712,481 A * 1/1973 Harwood .................. B25J 3/04
414/7
5,850,762 A * 12/1998 Kochanneck .............. B25J 9/08
180/65.1
(Continued)

FOREIGN PATENT DOCUMENTS

EP        0934805 A2    8/1999
JP        S61-44583 A    3/1986
(Continued)

OTHER PUBLICATIONS

PCT/ISA/210, "International Search Report for PCT/JP2014/069866," Oct. 28, 2014.
(Continued)

*Primary Examiner* — William Kelleher
*Assistant Examiner* — Jake Cook
(74) *Attorney, Agent, or Firm* — Hauptman Ham, LLP

(57) ABSTRACT

A manipulator includes an arm, a plurality of servo motors, a plurality of servo amplifiers, and at least one bellows container. The arm includes a plurality of joints and links. The plurality of the servo motors are disposed in a first space in the arm and capable of driving each of the plurality of the joints. The plurality of the servo amplifiers are disposed in the first space and each of the plurality of the servo amplifiers controls each of the plurality of the servo motors. The at least one bellows container with one closed end which is positioned away from the arm and another open end includes a second space which is connected to the first space at the open end. In the manipulator, each of the first space and the second space is filled with oil, and each of the plurality of the servo amplifiers is connected with a cable for serial communication or power-line carrier communication.

6 Claims, 10 Drawing Sheets

(51) Int. Cl.
*B25J 18/00* (2006.01)
*B25J 19/00* (2006.01)

(58) Field of Classification Search
CPC ..... B25J 9/08; F15B 2201/3153; B63C 11/52; H05K 5/068; H02K 5/132
See application file for complete search history.

(56) References Cited

U.S. PATENT DOCUMENTS

| | | | | |
|---|---|---|---|---|
| 6,323,615 | B1* | 11/2001 | Khairallah | B25J 5/007 318/561 |
| 2005/0016008 | A1* | 1/2005 | Raab | B23Q 35/04 33/503 |
| 2009/0114052 | A1* | 5/2009 | Haniya | B25J 9/0087 74/490.03 |

FOREIGN PATENT DOCUMENTS

| | | |
|---|---|---|
| JP | H05-16187 U | 3/1993 |
| JP | H06-39873 B2 | 5/1994 |
| JP | 2003-136454 A | 5/2003 |
| JP | 2006-000955 A | 1/2006 |

OTHER PUBLICATIONS

PCT/ISA/237, "Written Opinion of the International Searching Authority for PCT/JP2014/069866," Oct. 28, 2014.
English Translation of PCT/ISA/237, "Written Opinion of the International Searching Authority for PCT/JP2014/069866," Oct. 28, 2014.
Extended European Search Report in EP Application No. 14860417.6, dated Oct. 6, 2016.

* cited by examiner

MANIPULATOR

FIELD

The present application is a National Phase of International Application No. PCT/JP2014/069866 filed Jul. 28, 2014, and claims priority from Japanese Application No. 2013-232267, filed Nov. 8, 2013, the disclosure of which is hereby incorporated by reference herein in its entirety. The present disclosure relates to a manipulator.

BACKGROUND

In the field of marine resource development, an underwater device such as a remotely operated vehicle (ROV) and an autonomous underwater vehicle (AUV) is used. In an underwater device to be operated in the deep sea, a hydraulic manipulator driven by a hydraulic cylinder, for example, disclosed in Japanese Patent Publication No. H06-039873, is used in order to deal with sea pressure in the deep sea. In a case where an electric manipulator driven by an electric motor is used in the sea, a pressure equalizing structure is employed in which the electric motor is accommodated and oil-immersed in a container.

SUMMARY

For example, when the number of electric motors increases in an electric manipulator having a multi-joint structure, the number of cables also increases in proportion to the number of electric motors. It is often the case that at least a part of the cables is provided at a joint of the manipulator. Accordingly, when the number of cables increases and the cables are oil-immersed, there may be a case where an oil-immersion operation requires a certain amount of labor, or a case where it is difficult to achieve pressure equalization.

An object of the present disclosure is to provide an electric manipulator capable of suppressing the occurrence of nonuniformity of pressure when a cable is oil-immersed.

According to the present disclosure, there is provided a manipulator comprising: an arm that includes joints and links; servo motors that are disposed in a first space in the arm and each of which is configured to be capable of driving each of the joints; servo amplifiers that are disposed in the first space and each of which is configured to control each of the servo motors; and at least one bellows container with one open end and another closed end that includes a second space that is connected to the first space at the open end, wherein each of the first space and the second space is filled with oil, and each of the servo amplifiers is connected with a cable for serial communication or power-line carrier communication.

According to the present disclosure, since each of the servo amplifiers is connected with the cable for serial communication or power-line carrier communication, cable-saving (wiring-saving) can be achieved, for example, in comparison to conventional analog wiring. Therefore, an oil-immersion operation can be performed smoothly. Since the servo motor and the servo amplifier are accommodated in the arm to be integrated with the arm, connection of wiring between the servo motor and the servo amplifier can be completed in advance, for example, in a manufacturing plant of a manipulator. The bellows container connected to the arm elastically deforms based on sea pressure. The first space provided with the servo motor and the servo amplifier is connected to the second space in the bellows container, and each of the spaces is filled with oil. Therefore, even when the sea depth where the arm is disposed has varied and thus the sea pressure has varied, uniformity of the pressure between the first space and the second space is maintained by the deformation of the bellows container.

In the manipulator according to the disclosure, the first space may comprise: a first internal space in a first link in which a first servo motor capable of driving a first joint and a first servo amplifier are disposed; a second internal space in a second link in which a second servo motor capable of driving a second joint and a second servo amplifier are disposed; and a passage that connects the first internal space and the second internal space, and in which the cable is disposed, and the bellows container is connected to the first link. The first internal space of the first link and the second internal space of the second link are connected through the passage. Therefore, the uniformity of the pressure among the first internal space, the passage, the second internal space, and the second space, which are filled with oil, is maintained by connecting the bellows container to the first link to connect the first internal space of the first link to the second space, which is an internal space of the bellows container.

In the manipulator according to the disclosure, the first space may comprise: a first internal space in a first link in which a first servo motor capable of driving a first joint and a first servo amplifier are disposed; and a second internal space in a second link in which a second servo motor capable of driving a second joint and a second servo amplifier are disposed, and the bellows container is connected to each of the first link and the second link. The uniformity of the pressure among the first internal space, the second internal space, and the second space, which are filled with oil, is maintained by connecting the bellows container to the first link to connect the first internal space of the first link to the second space, which is an internal space of the bellows container, and by connecting the bellows container to the second link to connect the second internal space of the second link to the second space, which is an internal space of the bellows container.

In the manipulator according to the disclosure, the manipulator may comprise a controller that transmits a control signal to the servo amplifier, wherein the servo amplifier and the controller are connected with a cable for serial communication or power-line carrier communication. Since the servo amplifier and the controller are connected with the cable for serial communication or power-line carrier communication, cable-saving (wiring-saving) can be achieved, for example, in comparison to conventional analog wiring. Therefore, an oil-immersion operation can be performed smoothly.

In the manipulator according to the disclosure, the servo amplifier may include a power source unit. Accordingly, a distance between the servo amplifier and the power source unit is shortened, and thereby a length of the wiring for connecting the servo amplifier and the power source unit can be shortened.

In the manipulator according to the disclosure, the manipulator may comprise a detector that is disposed in the first space and detects a rotation amount of the joint, wherein the detector includes at least one of a resolver and a potentiometer. When the detector includes at least one of the resolver and the potentiometer, a rotation amount of the joint can be detected smoothly even when the first space has been oil-immersed.

With the manipulator according to the present disclosure, the occurrence of nonuniformity of pressure can be suppressed.

DESCRIPTION OF EMBODIMENTS

Hereinbelow, embodiments of the present disclosure will be described with reference to the drawings. However, the present disclosure is not limited thereto. Requirements for each of the embodiments described below can be combined appropriately. In addition, there may be a case where some components are not used.

First Embodiment

Figure 1:
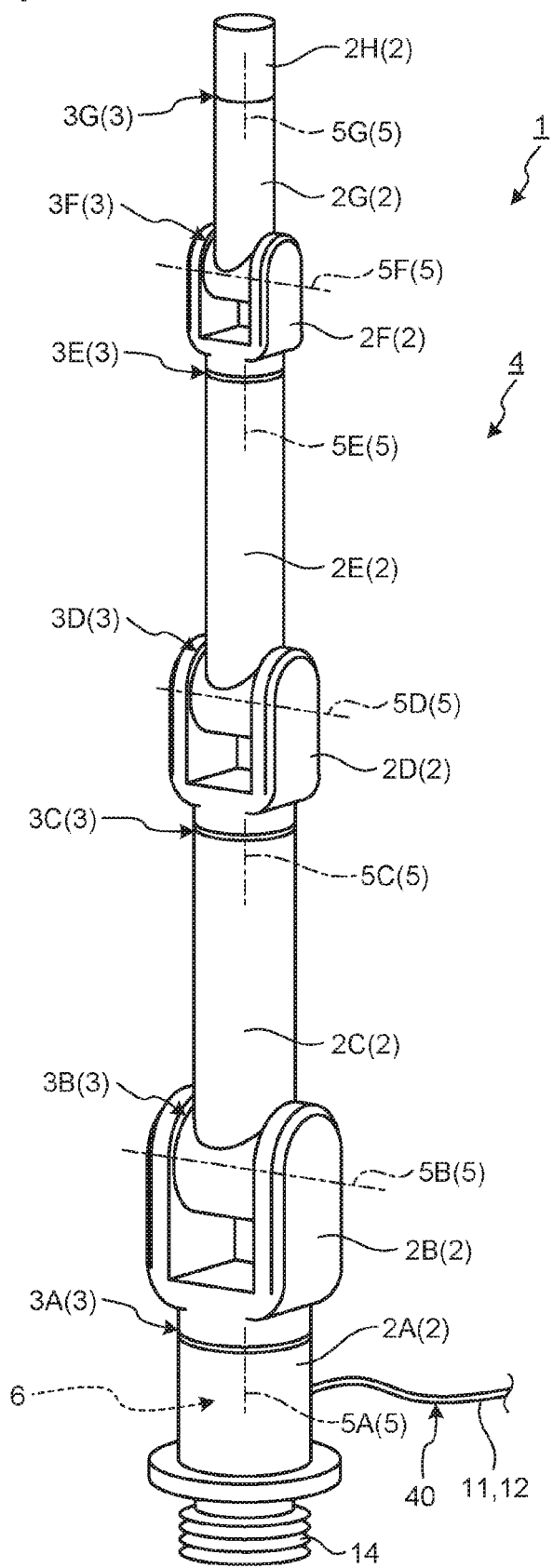
FIG. 1 is a perspective view illustrating an appearance of an example of a manipulator according to a first embodiment.
Figure 2:
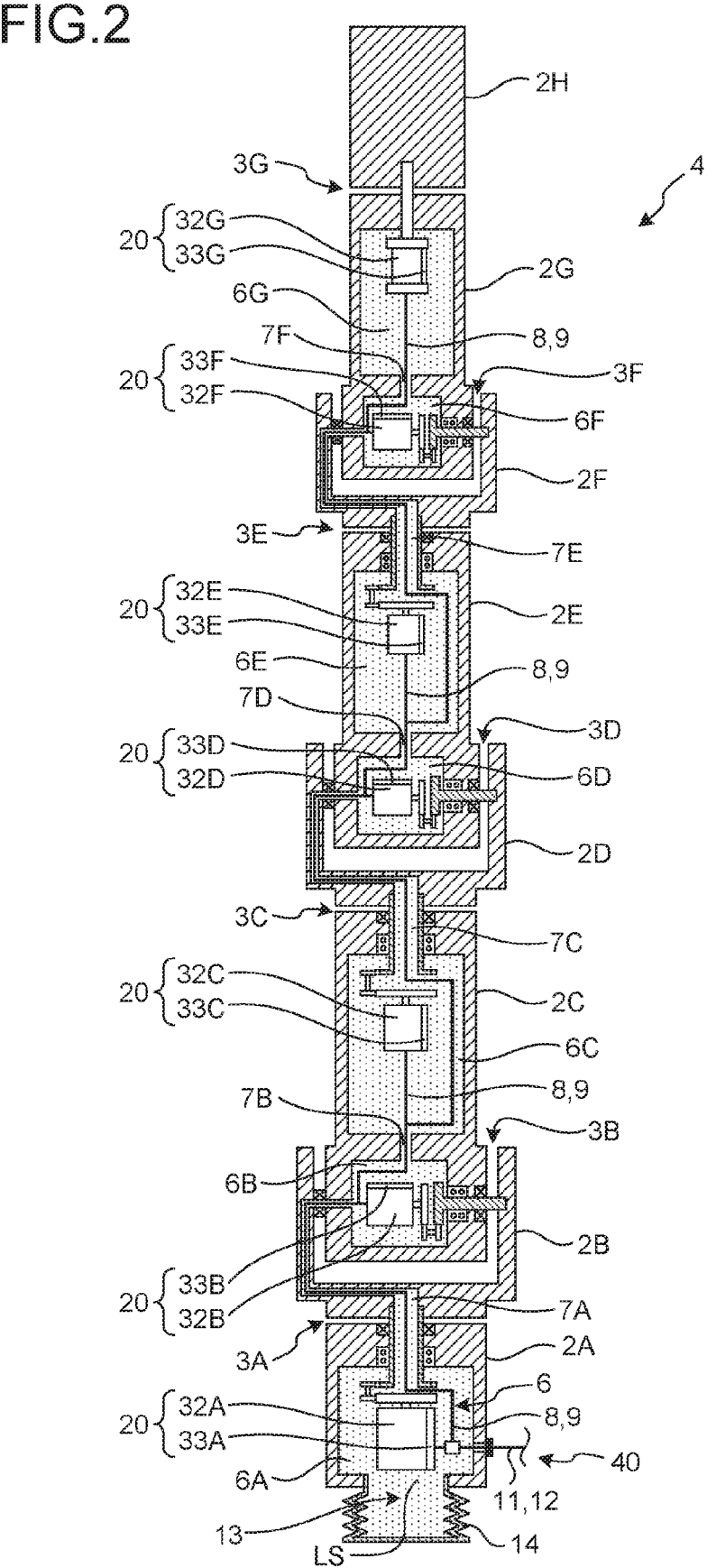
FIG. 2 is sectional view illustrating an example of the manipulator according to the first embodiment.
Figure 3:
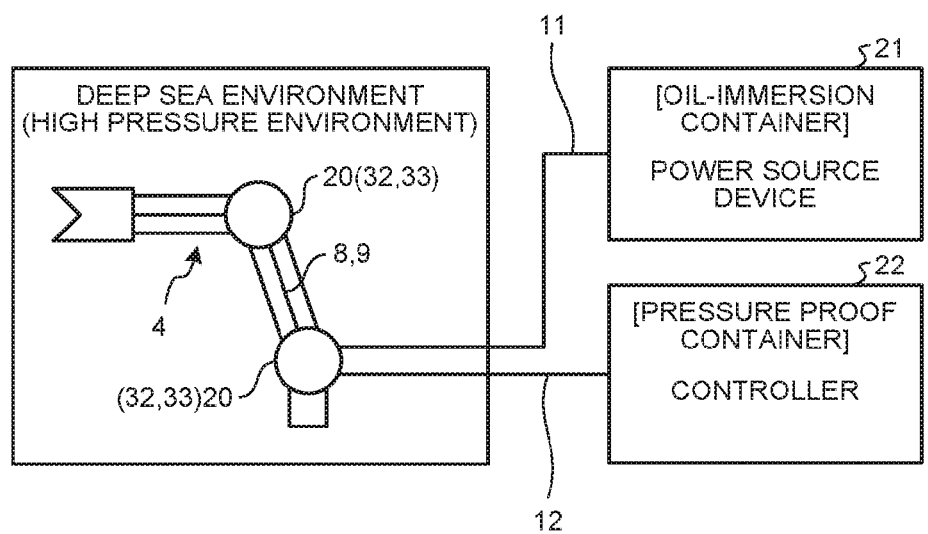
FIG. 3 is a diagram illustrating an example of a configuration of a manipulator system according to the first embodiment.

A first embodiment will be described. FIG. 1 is a perspective view illustrating an appearance of an example of a manipulator 1 according to the embodiment. FIG. 2 is sectional view illustrating an example of the manipulator 1 according to the embodiment. FIG. 3 is a diagram illustrating an example of a configuration of a manipulator system according to the embodiment.

In the embodiment, the manipulator 1 includes an arm 4 having a multi-joint structure. The arm 4 is used in a deep sea environment (high pressure environment). The arm 4 includes links 2 and joints 3 for connecting the links 2. In addition, the manipulator 1 includes servo motors 32, servo amplifiers 33, and a cable system 40. Each of the servo motors 32 is accommodated in the arm 4 and capable of driving each of the joints 3. Each of the servo amplifiers 33 is accommodated in the arm 4 and controls each of the servo motors 32.

Each of the links 2 rotates about a rotating shaft 5. In the embodiment, the arm 4 is an arm with seven degrees of freedom, and includes eight links 2A to 2H, seven joints 3A to 3G which couple each of the eight links 2A to 2H, and seven rotating shafts 5A to 5G.

The link 2B is coupled to the link 2A through the joint 3A, and rotates about the rotating shaft 5A with respect to the link 2A. The link 2C is coupled to the link 2B through the joint 3B, and rotates about the rotating shaft 5B with respect to the link 2B. The link 2D is coupled to the link 2C through the joint 3C, and rotates about the rotating shaft 5C with respect to the link 2C. The link 2E is coupled to the link 2D through the joint 3D, and rotates about the rotating shaft 5D with respect to the link 2D. The link 2F is coupled to the link 2E through the joint 3E, and rotates about the rotating shaft 5E with respect to the link 2E. The link 2G is coupled to the link 2F through the joint 3F, and rotates about the rotating shaft 5F with respect to the link 2F. The link 2H is coupled to the link 2G through the joint 3G, and rotates about the rotating shaft 5G with respect to the link 2G.

For example, a tool such as a hand for grasping an object to be grasped is attached to the link 2H at a distal end portion of the arm 4. The tool is attached to the link 2H through a power supply connector and a connector for providing a control signal.

The manipulator 1 includes the servo motors 32A to 32G capable of driving each of the joints 3A to 3G. The servo motors 32A to 32G are accommodated in the arm 4. In addition, the manipulator 1 includes the servo amplifiers 33A to 33G which control each of the servo motors 32A to 32G. The servo amplifiers 33A to 33G are accommodated in the arm 4. The arm 4 includes an internal space 6. The servo motors 32A to 32G and the servo amplifiers 33A to 33G are disposed in the internal space 6 in the arm 4.

The internal space 6 includes seven internal spaces 6A to 6G. In the embodiment, the link 2A includes the internal space 6A. The link 2C includes the internal spaces 6B and 6C. The link 2E includes the internal spaces 6D and 6E. The link 2G includes the internal spaces 6F and 6G. In the embodiment, the servo motor 32A and the servo amplifier 33A are disposed in the internal space 6A in the link 2A. The servo motor 32A is capable of driving the joint 3A. The servo amplifier 33A controls the servo motor 32A. The servo motor 32B and the servo amplifier 33B are disposed in the internal space 6B in the link 2C. The servo motor 32B is capable of driving the joint 3B. The servo amplifier 33B controls the servo motor 32B. The servo motor 32C and the servo amplifier 33C are disposed in the internal space 6C in the link 2C. The servo motor 32C is capable of driving the joint 3C. The servo amplifier 33C controls the servo motor 32C. The servo motor 32D and the servo amplifier 33D are disposed in the internal space 6D in the link 2E. The servo motor 32D is capable of driving the joint 3D. The servo amplifier 33D controls the servo motor 32D. The servo motor 32E and the servo amplifier 33E are disposed in the internal space 6E in the link 2E. The servo motor 32E is capable of driving the joint 3E. The servo amplifier 33E controls the servo motor 32E. The servo motor 32F and the servo amplifier 33F are disposed in the internal space 6F in the link 2G. The servo motor 32F is capable of driving the joint 3F. The servo amplifier 33F controls the servo motor 32F. The servo motor 32G and the servo amplifier 33G are disposed in the internal space 6G in the link 2G. The servo motor 32G is capable of driving the joint 3G. The servo amplifier 33G controls the servo motor 32G.

Each of the internal spaces 6A to 6G is connected to each other through the passage 7 (7A to 7F). The internal space 6 includes the passage 7. The internal space 6A and the internal space 6B are connected through the passage 7A. The internal space 6B and the internal space 6C are connected through the passage 7B. The internal space 6C and the internal space 6D are connected through the passage 7C. The internal space 6D and the internal space 6E are connected through the passage 7D. The internal space 6E and the internal space 6F are connected through the passage 7E. The internal space 6F and the internal space 6G are connected through the passage 7F.

The cable system 40 includes cables 8 with which the servo amplifiers 33 are connected. In the embodiment, each of the cables 8 is a cable for high speed serial communication. At least a part of the cable 8 is disposed in the internal space 6 (6A to 6G). In addition, at least a part of the cable 8 is disposed in the passage 7 (7A to 7F).

The cable system 40 includes a cable 9 with which the servo motors 32 and servo amplifiers 33 are connected. In the embodiment, each of the cables 9 is a power cable for supplying power. At least a part of the cable 9 is disposed in the internal space 6 (6A to 6G).

In addition, at least a part of the cable 9 is disposed in the passage 7 (7A to 7F).

The cable system 40 includes a cable 11 and a cable 12 with which the servo motor 32 and the servo amplifier 33 disposed in the internal space 6 in the arm 4 are connected to an external device disposed outside the internal space 6. As illustrated in FIG. 3, the servo motor 32 and the servo amplifier 33 are connected to a power source device 21, which is an external device, with the cable 11. The servo amplifier 33 is connected to a controller 22, which is an external device, with the cable 12. The power source device 21 supplies power to the servo motor 32 and the servo amplifier 33 through the cable 11. The controller 22 transmits a control signal to the servo amplifier 33 through the cable 12. In the embodiment, the cable 12, with which the servo amplifier 33 is connected to the controller 22, is a cable for high speed serial communication.

In the embodiment, the manipulator 1 includes a bellows container 14 which includes an internal space 13 connected to the internal space 6 in the arm 4. In the embodiment, the bellows container 14 is connected to the link 2A. The internal space 13 in the bellows container 14 and the internal space 6A in the link 2A are connected.

The internal space 6 in the arm 4, which includes the passage 7, is filled with an oil LS. The internal space 13 in the bellows container 14 is also filled with the oil LS. By filling each of the internal spaces 6 and 13 with the oil LS, the servo motor 32, the servo amplifier 33, the cable 8, the cable 9, at least a part of the cable 11, and at least a part of the cable 12 are oil-immersed.

The oil LS has an insulating property. Therefore, even in a case where the oil LS contacts an electric device such as the servo motor 32 and the servo amplifier 33, deterioration of performance of the electric devices is suppressed.

Figure 4:
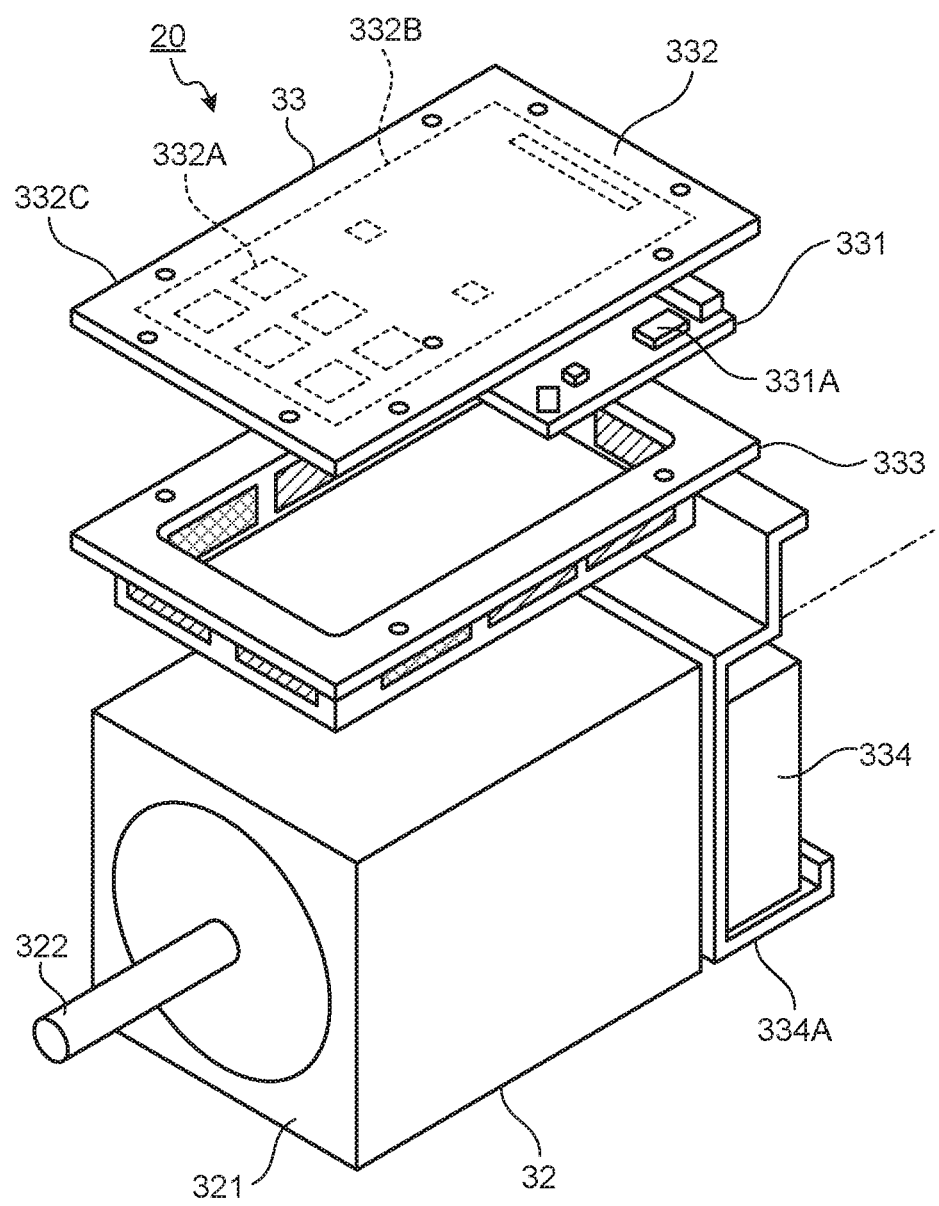
FIG. 4 is a view illustrating an example of a motor unit according to the first embodiment.

FIG. 4 illustrates an example of the servo motor 32 and the servo amplifier 33 according to the embodiment. In the embodiment, the servo motor 32 and the servo amplifier 33 are integrally configured. In the following description, an amplifier-integrated servo motor 20 which includes the servo motor 32 and the servo amplifier 33 thus integrated is appropriately referred to as a motor unit 20.

As illustrated in FIG. 4, the motor unit 20 includes both of the servo motor 32 and the servo amplifier 33. The servo motor 32 includes a housing 321 and an output shaft 322. At least a part of the output shaft 322 is disposed outside the housing 321. The joint 3 is driven by the rotation of the output shaft 322.

The servo amplifier 33 includes a control substrate 331, a power substrate 332, a case 333, and a power source unit 334. The case 333 is made from a material with a high thermal conductivity such as aluminum, and functions as a heat sink. The control substrate 331 is separated from the power substrate 332. An integrated circuit (IC) 331A for controlling the servo motor 32 is mounted on the control substrate 331.

The power substrate 332 includes a mounting substrate 332B and an aluminum plate 332C. On the mounting substrate 332B, a switching integrated circuit (IC) 332A is mounted. The switching IC 332A generates electric current to be supplied to the servo motor 32 based on a control signal from the IC 331A of the control substrate 331. The switching IC 332A is disposed on the mounting substrate 332B so as to be opposed to the control substrate 331. The control substrate 331 and the power substrate 332, which have been stacked, are accommodated in the case 333, and the aluminum plate 332C is disposed on an opening of the case 333. In other words, the aluminum plate 332C functions as a lid for closing the opening of the case 333.

The servo amplifier 33 is fixed to the housing 321 of the servo motor 32 through a vibration-proof mechanism such as rubber.

The power source unit 334 is fixed to a casing 334A. The casing 334A, to which the power source unit 334 has been fixed, is fixed to the housing 321 of the servo motor 32 through a vibration-proof mechanism such as rubber.

As described above, the cable 11, which is from the power source device 21, and the cable 12 for high speed serial communication, which is from the controller 22, are connected to the motor unit 20. In the embodiment, each of the servo amplifiers 33 is connected with the cable 8 for high speed serial communication. In addition, each of the motor units 20 is connected with the cable 9 for power supply.

In other words, in the embodiment, adjacent servo amplifiers 33 are connected with the cable 8 for high speed serial communication, and at least one of the servo amplifiers 33 is connected to the controller 22 with the cable 12 for high speed serial communication.

Figure 5:
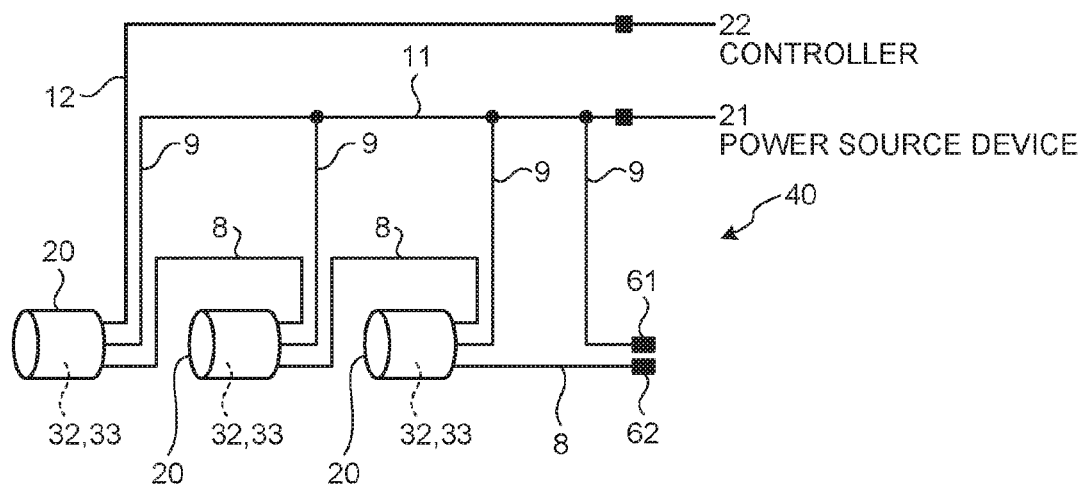
FIG. 5 is a diagram illustrating an example of a cable system according to the first embodiment.

FIG. 5 is a schematic diagram illustrating an example of a configuration of the cable system 40. As illustrated in FIG. 5, the manipulator 1 includes the motor units 20, each of which includes the servo motor 32 and the servo amplifier 33. In the example illustrated in FIG. 5, the controller 22 and the servo amplifier 33 of one of the motor units 20 are connected with the cable 12.

The servo motors 33 of adjacent motor units 20 are connected with the cables 8. The controller 22 transmits a control signal to one servo amplifier 33 through the cable 12. The control signal transmitted to the servo amplifier 33 is sequentially transmitted to other servo amplifiers 33 through the cables 8.

The cable 11 connected to the power source device 21 is connected to the cables 9. The cable 11 and each of the motor units 20 are connected through the cable 9. The cable 9 is connected to the power source unit 334 of the motor unit 20.

In addition, the motor unit 20 farthest from the cable 12 (in the embodiment, the motor unit 20 disposed in the internal space 6G) and a connector 62 for providing a control signal, which is provided in the link 2H, are connected with the cable 8. Consequently, a control signal is transmitted also to a tool attached to the link 2H.

In addition, the cable 11 and a power supply connector 61 provided in the link 2H are connected with the cable 9. Consequently, power is supplied also to a tool attached to the link 2H.

In the cable system 40 illustrated in FIG. 5, a control signal from the controller 22 is transmitted to the servo amplifier 33 (33A) of a first motor unit 20, whereby driving of the joint 3 (3A) by the motor unit 20 is controlled. Similarly, a motor unit 20 adjacent thereto receives a control signal from the controller 22 through the cable 8, thereby driving the joint 3 (3B). In the manner as described above, the control signals from the controller 22 to the motor units 20 are sequentially propagated through the cables 8.

Figure 6:
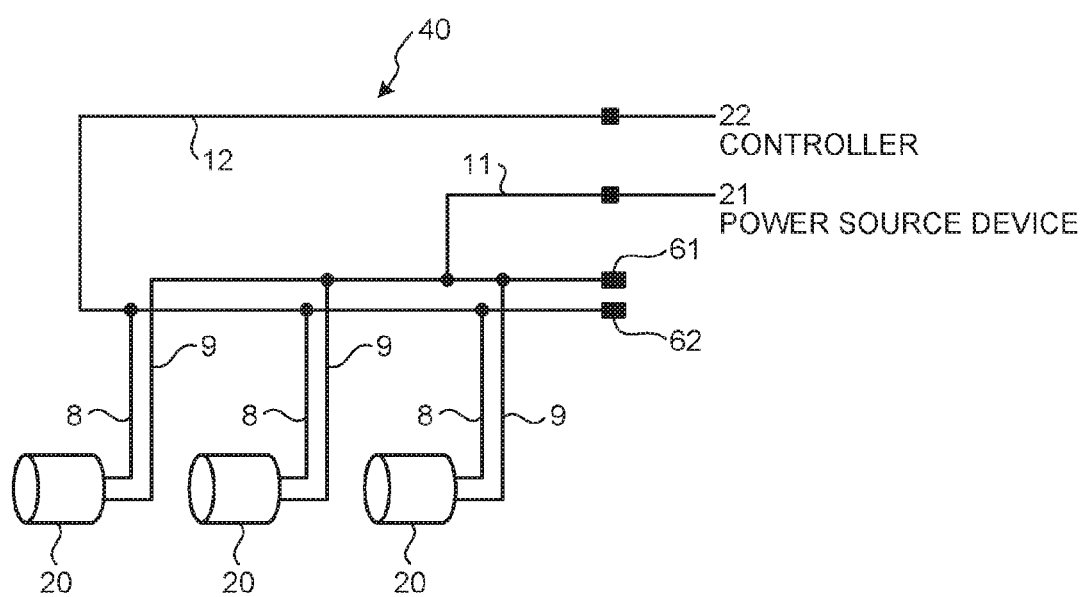
FIG. 6 is a diagram illustrating an example of the cable system according to the first embodiment.

FIG. 6 is a schematic diagram illustrating an example of a configuration of the cable system 40. In the example illustrated in FIG. 6, the cable 12 from the controller 22 and each of the servo amplifiers 33 of the motor units 20 are connected through the cables 8. The controller 22 transmits a control signal to each of the servo amplifiers 33 through the cable 12 and the cables 8. The configuration of the cable system 40 in which power is supplied from the power source device 21 is the same as that described with reference to FIG. 5.

Figure 7:
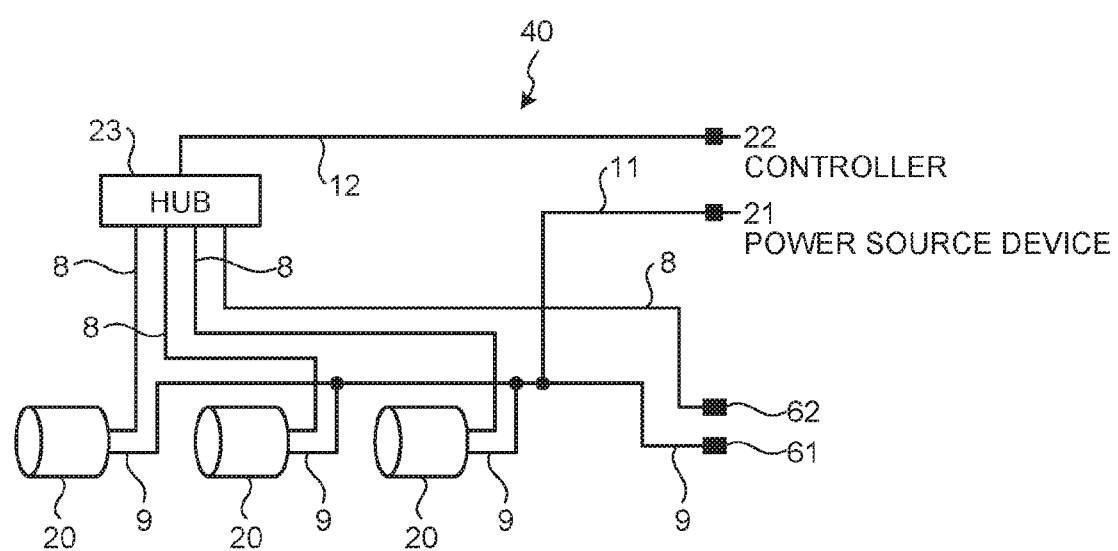
FIG. 7 is a diagram illustrating an example of the cable system according to the first embodiment.

FIG. 7 is a schematic diagram illustrating an example of a configuration of the cable system 40. In the example illustrated in FIG. 7, the cable 12 from the controller 22 is connected to a hub 23, and the hub 23 and each of the servo amplifiers 33 of the motor units 20 are connected through the cables 8. The controller 22 transmits a control signal to each of the servo amplifiers 33 through the cable 12 and the cables 8. The configuration of the cable system 40 in which power is supplied from the power source device 21 is the same as that described with reference to FIG. 5.

Figure 8:
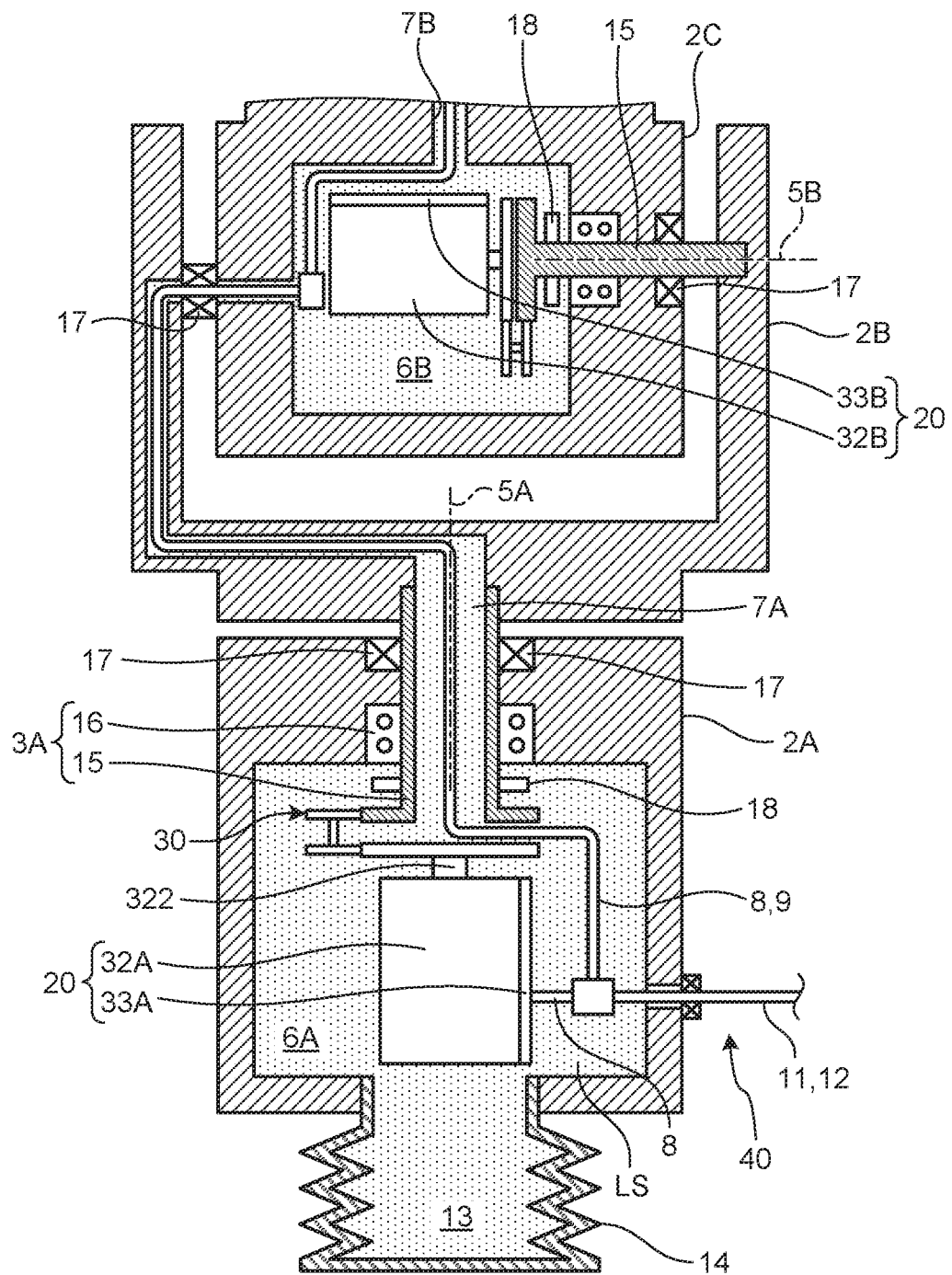
FIG. 8 is a partially enlarged view of FIG. 2.

FIG. 8 is a partially enlarged view of FIG. 2. The manipulator 1 includes the motor unit 20 which is disposed in the internal space 6A in the link 2A and includes the servo motor 32A and the servo amplifier 33A, and the motor unit 20 which is disposed in the internal space 6B in the link 2C and includes the servo motor 32B and the servo amplifier 33B. As described with reference to FIGS. 5, 6, and 7, adjacent motor units 20 are connected with the cable 8 for high speed serial communication. In addition, adjacent motor units 20 are connected with the cable 9 for power supply.

The internal space 6A in the link 2A is connected to the internal space 6B in the link 2C through the passage 7A. The internal space 6B in the link 2C is connected to the internal space 6C (not illustrated in FIG. 8) in the link 2C through the passage 7B. The internal space 6A is connected to the internal space 13 in the bellows container 14. The cables 8 and 9 are disposed in each of the internal space 6A, the passage 7A, the internal space 6B, the passage 7B, and the internal space 6C.

Furthermore, in FIG. 8, each of the internal space 13, the internal space 6A, the passage 7A, the internal space 6B, the passage 7B, and the internal space 6C is filled with the oil LS.

The link 2A and the link 2B are coupled through a coupling member 15. The coupling member 15 functions as a power transmission mechanism. The joint 3A includes the coupling member 15. The joint 3A includes the coupling member 15 and a bearing member 16. The bearing member 16 is provided in the link 2A and rotatably supports the coupling member 15. One end portion (proximal end portion) of the coupling member 15 is disposed in the internal space 6A, and the other end portion (distal end portion) of the coupling member 15 is fixed to the link 2B. The coupling member 15 includes a gear provided in one end portion thereof. A reduction gear 30 is disposed between the output shaft 322 of the servo motor 32A and the coupling member 15. When the output shaft 322 rotates, the reduction gear 30 is operated. The gear of the coupling member 15 engages with a gear of the reduction gear 30. When the servo motor 32A is operated to cause the output shaft 322 to rotate, the coupling member 15 engaging with the gear of the reduction gear 30 rotates about the rotating shaft 5A. Since the other end portion of the coupling member 15 is fixed to the link 2B, the rotation of the coupling member 15 causes the link 2B to rotate about the rotating shaft 5A with respect to the link 2A.

In the embodiment, at least a part of the passage 7A is provided in the coupling member 15. The passage 7A includes the rotating shaft 5A. Therefore, the cable 8 disposed in the passage 7A passes through the rotating shaft 5A or the vicinity of the rotating shaft 5A. Accordingly, even when the link 2B rotates with respect to the link 2A, twisting of the cable 8 or application of a load on the cable 8 is suppressed.

In the embodiment, the cable 8 is a cable for high speed serial communication, and cable-saving is achieved. Accordingly, the number of the cables 8 disposed in the passage 7A can be suppressed. Consequently, the passage 7A is filled with the oil LS smoothly. In addition, even when the joint 3A rotates, application of a load on the cable 8 is suppressed.

In the embodiment, a detector 18 is disposed in the internal space 6A. The detector 18 detects a rotation amount of the joint 3A (rotation amount of the coupling member 15). In the embodiment, the detector 18 is a resolver. The detector 18 may also be a potentiometer. A value detected by the detector 18 is output to the servo amplifier 33A or the controller 22. Based on the value detected by the detector 18, the servo amplifier 33A controls the servo motor 32A such that the rotation amount of the joint 3A is adjusted to be a target value. The detector 18 may detect a rotation amount of a motor shaft (for example, the output shaft 322) of the servo motor 32A. Since the rotation amount of the output shaft 322 correlates with the rotation amount of the joint 3A, the servo amplifier 33A may control the servo motor 32A such that the rotation amount of the joint 3A is adjusted to be a target value, based on a value detected by the detector 18 which has detected the rotation amount of the output shaft 322.

In addition, although detailed description is omitted, the link 2B and the link 2C are coupled through the coupling member 15. The operation of the servo motor 32B causes the coupling member 15 to rotate about the rotating shaft 5B. Consequently, the link 2C rotates about the rotating shaft 5B with respect to the link 2B. The detector 18 capable of detecting a rotation amount of the joint 3B is disposed in the internal space 6B. The servo amplifier 33B controls the servo motor 32B based on a value detected by the detector 18.

In the embodiment, the coupling member 15 has been described as an example of a power transmission mechanism. However, the power transmission mechanism may have an arbitrary configuration. The passage 7 may be provided in at least a part of the power transmission mechanism.

In the embodiment, a sealing member 17 is disposed around the passage 7A which connects the internal space 6A to the internal space 6B. In the example illustrated in FIG. 8, two sealing members 17 are disposed around the passage 7A. One sealing member 17 is disposed to surround at least a part of the coupling member 15 in the link 2A. Another sealing member 17 is disposed to surround the passage 7A between the link 2B and the link 2C. Consequently, leakage of the oil LS in the internal space 6 is suppressed.

In the embodiment, the arm 4 is connected to the bellows container 14 which includes a bellows member. The internal space 6 in the arm 4 and the internal space 13 in the bellows container 14 are connected. Not only the internal space 6 in the arm 4, but also the internal space 13 in the bellows container 14 is filled with the oil LS. In the sea, pressure (sea pressure) increases as depth increases. When the depth has increased and thereby the pressure has increased, the bellows container 14 contracts. Consequently, the pressure in the internal space 6 in the arm 4 and the pressure in the internal space 13 in the bellows container 14 become equal to the pressure of the sea according to the depth. In addition, pressure (sea pressure) decreases as depth decreases. When the depth has decreased and thereby the pressure has decreased, the bellows container 14 expands. Consequently, the pressure in the internal space 6 in the arm 4 and the pressure in the internal space 13 in the bellows container 14 become equal to the pressure of the sea according to the depth. As described above, by providing the bellows container 14 which is expandable and contractable, it is possible to make the pressure in the internal space 6 in the arm 4 and the pressure in the internal space 13 in the bellows container 14 equal to the pressure of the sea according to the depth.

In the embodiment, the internal space 13 in the bellows container 14 is connected to the internal space 6A in the link 2A. The internal space 6A is connected to the internal space 6B through the passage 7A. Therefore, the internal space 13 is connected to the internal space 6B through the internal space 6A and the passage 7A. In the embodiment, the internal space 6A at the proximal end portion of the arm 4 and the internal space 6G at the distal end portion thereof are connected through the internal spaces 6B to 6F and the passages 7A to 7F. Consequently, through the expansion and contraction of the bellows container 14, all the pressure in the internal space 6 in the arm 4 become equal to the pressure in the internal space 13 in the bellows container 14.

As described above, according to the embodiment, since each of the servo amplifiers 33 is connected with the cable 8 for high speed serial communication, cable-saving (wiring-saving) can be achieved, for example, in comparison to conventional analog wiring. Therefore, an oil-immersion operation for the internal space 6 can be performed smoothly. Since cable-saving is achieved, it is possible to smoothly drive, for example, the joint 3. Since the servo motor 32 and the servo amplifier 33 are accommodated in the arm 4 to be integrated with the arm 4, connection of wiring between the servo motor 32 and the servo amplifier 33 can be completed in advance, for example, in a manufacturing plant of the manipulator 1. The bellows container 14 connected to the arm 4 deforms elastically based on sea pressure. The internal space 6 provided with the servo motor 32 and the servo amplifier 33 is connected to the internal space 13 in the bellows container 14, and each of the spaces is filled with the oil LS. Therefore, even when the depth of the sea where the arm 4 is disposed has varied and thus the sea pressure has varied, uniformity of the pressure between the internal space 6 and the internal space 13 is maintained by the deformation of the bellows container 14.

In the embodiment, an internal space 6 of a link 2 (for example, the internal space 6A) and an internal space 6 of a link 2 adjacent to the link 2 (for example, the internal space 6B) are connected though the passage 7. Therefore, by connecting the bellows container 14 to one of the links 2, thereby connecting the internal space 6 in the link 2 to the internal space 13 in the bellows container 14, uniformity of the pressure between the internal space 6 including the passage 7 and the internal space 13, which are filled with the oil LS, is maintained. Since the number of the bellows containers 14 to be provided may be one, the arm 4 (joint 3) can be smoothly driven.

In the embodiment, the servo amplifier 33 and the controller 22 are connected with the cable 12 for high speed serial communication. Consequently, cable-saving (wiring-saving) can be achieved, for example, in comparison to conventional analog wiring. Therefore, an oil-immersion operation can be performed smoothly. The arm 4 can be smoothly driven.

In the embodiment, the servo amplifier 33 includes the power source unit 334. Accordingly, a distance between the servo amplifier 33 and the power source unit 334 is shortened, and thereby a length of the wiring for connecting the servo amplifier 33 and the power source unit 334 can be shortened.

In the embodiment, the detector 18 which detects the rotation amount of the joint 3 includes at least one of the resolver and the potentiometer. Therefore, a rotation amount of the joint 3 can be detected smoothly even when the internal space 6 has been oil-immersed.

Second Embodiment

A second embodiment will be described. In the embodiment described below, with regard to the same or similar components as those in the above described embodiment, the same reference signs are attached thereto, and description thereof will be simplified or omitted.

Figure 9:
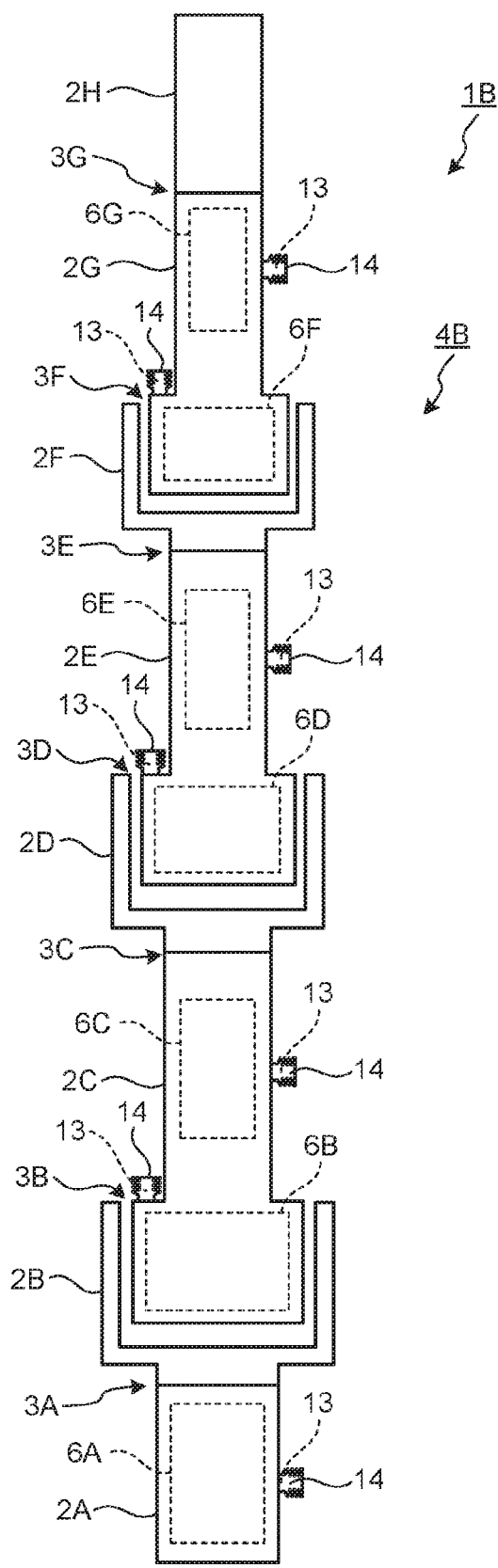
FIG. 9 is a schematic view illustrating an example of a manipulator according to a second embodiment.

FIG. 9 is a schematic view illustrating an appearance of an example of an arm 4B of a manipulator 1B according to the embodiment. As with the above-described embodiment, the arm 4B includes links 2A to 2H, and joints 3A to 3G. The arm 4B includes internal spaces 6A to 6G in each of which a motor unit 20 is disposed. Each of the internal spaces 6A to 6G is filled with an oil LS.

In the embodiment, passages are not provided which connect the internal spaces 6A to 6G. In other words, the internal spaces 6A to 6G are not connected.

In the embodiment, an internal space (passage) is not provided in the link 2B, the link 2D, and the link 2F. The link 2A includes the internal space 6A in which the motor unit 20 is disposed. The link 2C includes the internal spaces 6B and 6C in each of which the motor unit 20 is disposed. The link 2E includes the internal spaces 6D and 6E in each of which the motor unit 20 is disposed. The link 2G includes the internal spaces 6F and 6G in each of which the motor unit 20 is disposed.

In the embodiment, a bellows container 14 is connected to each of the links 2. The bellows container 14 is connected to the link 2A such that an internal space 13 in the bellows container 14 is connected to the internal space 6A. Two bellows containers 14 are connected to the link 2C such that an internal space 13 in one bellows container 14 is connected to the internal space 6B, and an internal space 13 in another bellows container 14 is connected to the internal space 6C. Two bellows containers 14 are connected to the link 2E such that an internal space 13 in one bellows container 14 is connected to the internal space 6D, and an internal space 13 in another bellows container 14 is connected to the internal space 6E. Two bellows containers 14 are connected to the link 2G such that an internal space 13 in one bellows container 14 is connected to the internal space 6F, and an internal space 13 in another bellows container 14 is connected to the internal space 6G. Each of the internal spaces 13 and 6A to 6G is filled with the oil LS.

As described above, also in the embodiment, even when the sea pressure acting on the arm 4B has varied, uniformity of the pressure between each of the internal spaces 6A to 6G and the internal space 13, which are filled with the oil LS, is maintained.

Figure 10:
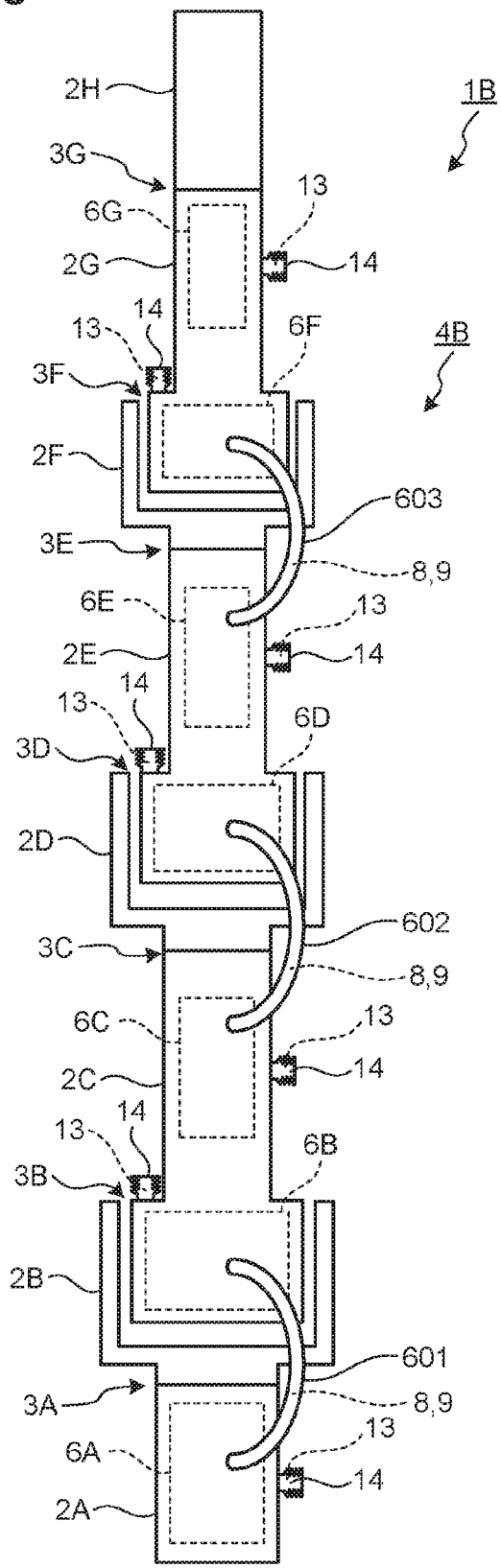
FIG. 10 is a schematic view illustrating an example of the manipulator according to the second embodiment.

FIG. 10 illustrates an example of the manipulator 1B according to the embodiment. In FIG. 10, the manipulator 1B includes a tube 601, a tube 602, and a tube 603. The tube 601 connects the internal space 6A and the internal space 6B adjacent to each other through the joints 3A and 3B. The tube 602 connects the internal space 6C and the internal space 6D adjacent to each other through the joints 3C and 3D. The tube 603 connects the internal space 6E and the internal space 6F adjacent to each other through the joints 3E and 3F. Each of the tubes 601, 602, and 603 is disposed outside the arm 4B. In the example illustrated in FIG. 10, at least a part of a cable 8 for communication and at least a part of a cable 9 for power supply are disposed in each of the tubes 601, 602, and 603. In the example illustrated in FIG. 10, the cables 8 and 9 are not disposed in the joints 3A to 3F. Therefore, the joints 3A to 3F can move smoothly.

Third Embodiment

A third embodiment will be described. In the embodiment described below, with regard to the same or similar components as those in the above described embodiments, the same reference signs are attached thereto, and description thereof will be simplified or omitted.

Figure 11:
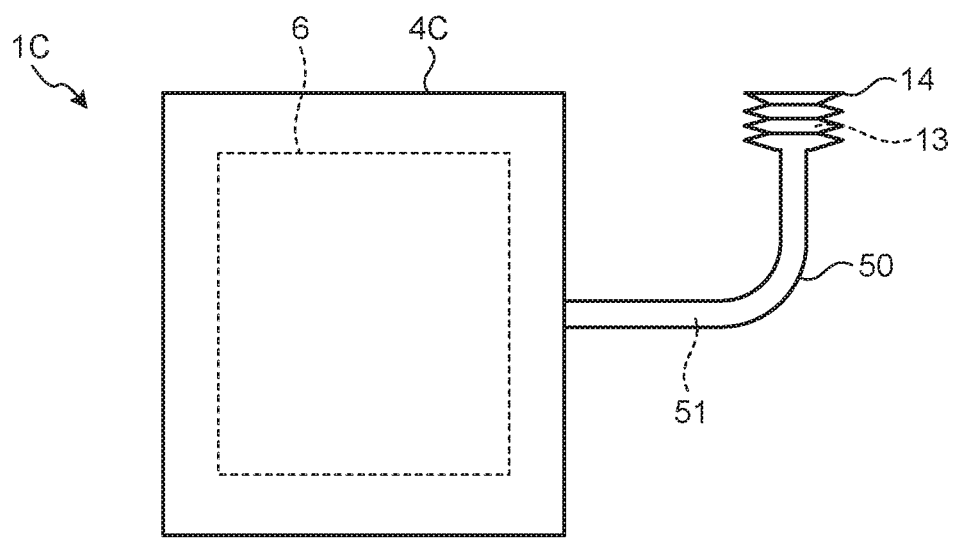
FIG. 11 is a schematic view illustrating an example of a manipulator according to a third embodiment.

FIG. 11 is a view schematically illustrating an example of a manipulator 1C according to the embodiment. In each of the embodiments described above, the example in which the bellows container 14 is directly connected to the arm 4C (link 2) has been described. As illustrated in FIG. 11, a bellows container 14 and an arm 4C may be connected through a tube member 50. In other words, an internal space 6 in the arm 4C and an internal space 13 in the bellows container 14 may be connected through a flow channel 51 in the tube member 50. Each of the internal space 6 in the arm 4, the internal space 13 in the bellows container 14, and the flow channel 51 in the tube member 50 is filled with an oil LS, and thereby uniformity of the pressure is maintained.

In each of the embodiments described above, the servo motor 32 and the servo amplifier 33 are integrally configured. The servo motor 32 and the servo amplifier 33 may be disposed separately. In other words, the servo motor 32 and the servo amplifier 33 may be disposed in separate positions. For example, the servo motor 32A and the servo amplifier 33A disposed in the internal space 6A may be disposed separately in the internal space 6A. Similarly, the servo motor 32B and the servo amplifier 33B disposed in the internal space 6B may be disposed separately in the internal space 6B. The same is true for the servo motors 32C to 32G and the servo amplifiers 33C to 33G disposed in the internal spaces 6C to 6G, respectively.

In each of the embodiments described above, the cable 8 may be a cable for power-line carrier communication. The power-line carrier communication is also referred to as power line communication (PLC), or power line telecommunication (PLT). When the cable 8 is a cable for power-line carrier communication, the cable 8 has both functions of a power line and a communication line. Similarly, the cable 12 may be a cable for power-line carrier communication.

The invention claimed is:

1. A manipulator comprising:
an arm that includes joints and links;
servo motors that are disposed in a first space in the arm and each of which is configured to be capable of driving each of the joints;
servo amplifiers that are disposed in the first space and each of which is configured to control each of the servo motors; and
at least one bellows container with one closed end which is positioned away from the arm and another open end that includes a second space that is connected to the first space at the open end, wherein
each of the first space and the second space is filled with oil, and
each of the servo amplifiers is connected with a cable for serial communication or power-line carrier communication.

2. The manipulator according to claim 1, wherein the first space comprises:
a first internal space in a first link as one of the links in which a first servo motor as one of the servo motors capable of driving a first joint as one of the joints and a first servo amplifier as one of the servo amplifiers are disposed;
a second internal space in a second link as one of the links in which a second servo motor as one of the servo motors capable of driving a second joint as one of the joints and a second servo amplifier as one of the servo amplifiers are disposed; and
a passage that connects the first internal space and the second internal space, and in which the cable is disposed, and
the bellows container is connected at the open end to the first internal space in the first link.

3. The manipulator according to claim 1, wherein the first space comprises:
a first internal space in a first link as one of the links in which a first servo motor as one of the servo motors capable of driving a first joint as one of the joints and a first servo amplifier as one of the servo amplifiers are disposed; and
a second internal space in a second link as one of the links in which a second servo motor as one of the servo motors capable of driving a second joint as one of the joints and a second servo amplifier as one of the servo amplifiers are disposed, and
the bellows container is connected at the open end to each of the first internal space in the first link and the second internal space in the second link.

4. The manipulator according to claim 1, comprising:
a controller that transmits a control signal to each of the servo amplifiers, wherein
each of the servo amplifiers and the controller are connected with a cable for serial communication or power-line carrier communication.

5. The manipulator according to claim 1, wherein each of the servo amplifiers includes a power source unit.

6. The manipulator according to claim 1, comprising:
detectors that are disposed in the first space and each of which is configured to detect a rotation amount of each of the joints, wherein
each of the detectors include at least one of a resolver and a potentiometer.

* * * * *